US012591519B2

(12) United States Patent
Cheng

(10) Patent No.: US 12,591,519 B2
(45) Date of Patent: Mar. 31, 2026

(54) MEMORY DEVICE AND OPERATING METHOD THEREOF

(71) Applicant: Nuvoton Technology Corporation, Hsinchu (TW)

(72) Inventor: Min-Nan Cheng, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 234 days.

(21) Appl. No.: 18/334,370

(22) Filed: Jun. 13, 2023

(65) Prior Publication Data

US 2024/0095178 A1     Mar. 21, 2024

(30) Foreign Application Priority Data

Sep. 16, 2022     (TW) .................................. 111135244

(51) Int. Cl.
*G06F 12/10* (2016.01)
(52) U.S. Cl.
CPC .................................... *G06F 12/10* (2013.01)
(58) Field of Classification Search
CPC ................. G06F 12/10; G06F 12/0246; G06F 2212/7208; G06F 2212/7201
See application file for complete search history.

(56) References Cited

U.S. PATENT DOCUMENTS

| | | | |
|---|---|---|---|
| 4,922,415 A | 5/1990 | Hemdal | |
| 11,144,460 B2 | 10/2021 | Lee | |
| 2009/0172295 A1* | 7/2009 | Steiner ................ | G06F 12/0817 711/141 |
| 2017/0017402 A1 | 1/2017 | Zheng et al. | |
| 2019/0310780 A1* | 10/2019 | Gholamipour ........ | G06F 3/0679 |

FOREIGN PATENT DOCUMENTS

| | | |
|---|---|---|
| CN | 109120477 | 9/2021 |
| CN | 114968366 | 8/2022 |
| TW | 201525690 | 7/2015 |
| TW | 202137011 | 10/2021 |
| TW | 202141284 | 11/2021 |
| TW | I754206 | 2/2022 |

* cited by examiner

*Primary Examiner* — Gary W. Cygiel
(74) *Attorney, Agent, or Firm* — JCIPRNET

(57) ABSTRACT

A memory device and an operating method thereof are provided. The memory device includes a memory controller, an address transforming circuit, and a memory array. The memory controller generates a programming address among multiple candidate programming addresses according to an application. The address transforming circuit stores multiple physical address data and multiple mask data. The physical address data respectively correspond to the candidate programming addresses. The address transforming circuit executes a first logical calculation according to the programming address, the physical address data, and the mask data to generate a physical address. The memory controller executes an access operation on the memory array according to to the physical address.

18 Claims, 3 Drawing Sheets

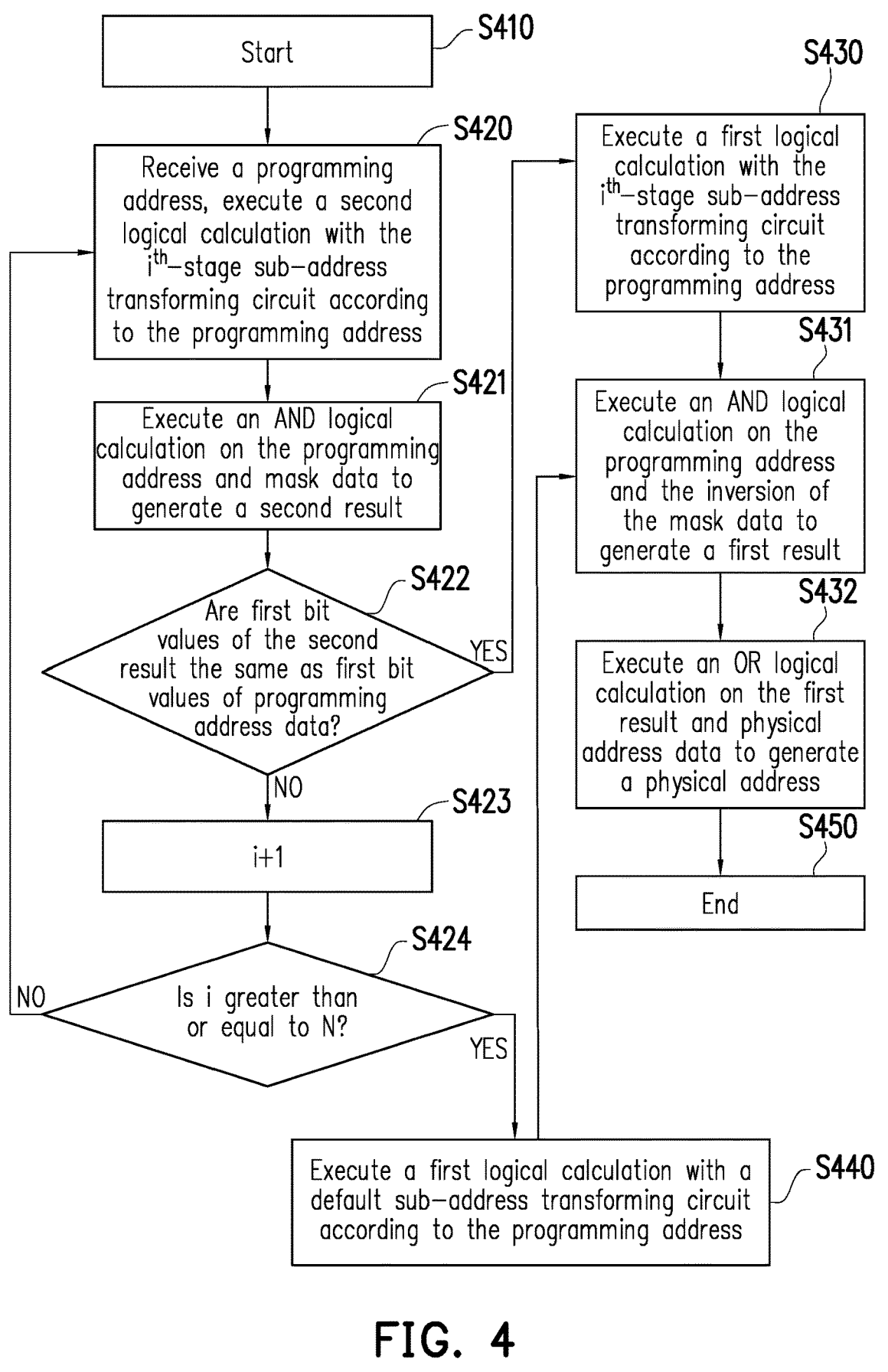

Start — S410

Receive a programming address, execute a second logical calculation with the $i^{th}$-stage sub-address transforming circuit according to the programming address — S420

Execute an AND logical calculation on the programming address and mask data to generate a second result — S421

Are first bit values of the second result the same as first bit values of programming address data? — S422

YES / NO i+1 — S423

Is i greater than or equal to N? — S424

NO / YES

Execute a first logical calculation with the $i^{th}$-stage sub-address transforming circuit according to the programming address — S430

Execute an AND logical calculation on the programming address and the inversion of the mask data to generate a first result — S431

Execute an OR logical calculation on the first result and physical address data to generate a physical address — S432

End — S450

Execute a first logical calculation with a default sub-address transforming circuit according to the programming address — S440

FIG. 4

MEMORY DEVICE AND OPERATING METHOD THEREOF

CROSS-REFERENCE TO RELATED APPLICATION

This application claims the priority benefit of Taiwan application serial no. 111135244, filed on Sep. 16, 2022. The entirety of the above-mentioned patent application is hereby incorporated by reference herein and made a part of this specification.

BACKGROUND

Technical Field

The disclosure relates to a memory device and an operating method thereof, and particularly to a memory device and an operating method thereof that can transform a programming address into a physical address in different ranges.

Description of Related Art

The flash memory may store firmware, such as a boot loader and other applications. Generally speaking, the firmware has preset a program (execution) address (also referred to as a booting address) and a corresponding physical address, so a microcontroller embedded in the flash memory may access the flash memory according to a programming address and the corresponding physical address to execute a booting program or other applications (hereinafter referred to as an application). As technology evolves, the architecture of the microcontroller changes to accommodate electronic devices with different product life cycles and safety requirements.

For example, for the flash memory that uses a special architecture (for example, TrustZone), when the firmware is in the development or debugging stage, the programming address of the application is multiple booting addresses. For example, the booting addresses are changed from a secure code to a non-secure code. For another example, for the flash memory that supports firmware update, the flash memory is divided into an active bank and a backup bank. When the firmware is in the update stage, the programming address of the updated firmware is a flash base address. The flash base address may be exchanged between the backup bank and the active bank. However, the changed or exchanged programming address and the default physical address cannot be cross-referenced, causing the microcontroller to be unable to correctly access the flash memory, such that the application cannot be correctly executed.

SUMMARY

The disclosure provides a memory device and an operating method thereof, which can transform a programming address into a physical address in different ranges to be applied to change of multiple booting addresses and exchange of a flash base address, so that the memory device can be correctly accessed.

The memory device of an embodiment of the disclosure includes a memory controller, an address transforming circuit, and a memory array. The memory controller is used to generate a programming address among multiple candidate programming addresses according to an application. The address transforming circuit is coupled to the memory controller. The address transforming circuit is used to store multiple physical address data and multiple mask data. The physical address data respectively correspond to the candidate programming addresses. The address transforming circuit is used to execute a first logical calculation according to the programming address, the physical address data, and the mask data to generate a physical address. The memory array is coupled to the memory controller and the address transforming circuit. The memory controller is used to execute an access operation on the memory array according to the physical address.

An embodiment of the disclosure further provides an operating method of a memory device. The operating method includes the following steps. A programming address among multiple candidate programming addresses is generated through a memory controller according to an application. A first logical calculation is executed through an address transforming circuit according to the programming address, multiple physical address data, and multiple mask data to generate a physical address. The address transforming circuit is used to store the physical address data and the mask data. The physical address data respectively correspond to the candidate programming addresses. An access operation is executed on a memory array through the memory controller according to the physical address.

Based on the above, the memory device and the operating method thereof of the embodiments of the disclosure can execute the logical calculation on the programming address through the address transforming circuit to generate the physical address in different ranges, rather than simply generating the physical address by mapping. Therefore, the memory device can be used for change of multiple booting addresses and exchange of a flash base address to correctly access the memory device.

In order for the features and advantages of the disclosure to be more comprehensible, the following specific embodiments are described in detail in conjunction with the drawings.

BRIEF DESCRIPTION OF THE DRAWINGS

FIG. 4 is a flowchart of an operating method of a memory device according to an embodiment of the disclosure.

DETAILED DESCRIPTION OF DISCLOSED EMBODIMENTS

Figure 1:
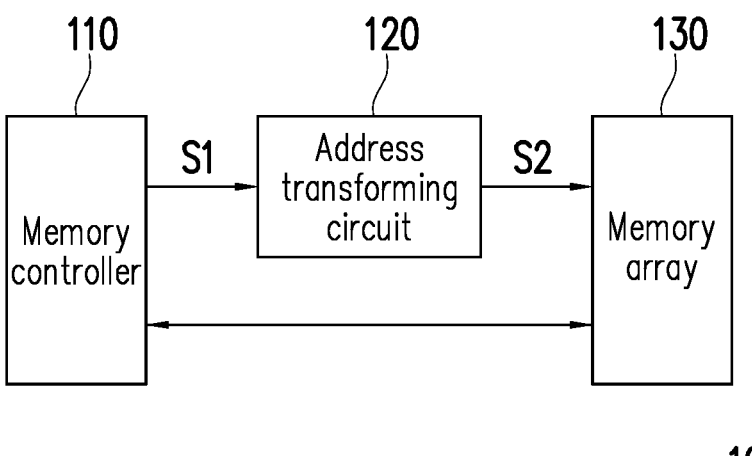
FIG. 1 is a block diagram of a memory device according to an embodiment of the disclosure.

Some embodiments of the disclosure will be described in detail below with reference to the drawings. The reference numerals quoted in the following description will be regarded as referring to the same or similar elements when the same reference numerals appear in different drawings. The embodiments are only a part of the disclosure and do not disclose all possible implementations of the disclosure. More specifically, the embodiments are only examples within the scope of the claims of the disclosure.

FIG. 1 is a block diagram of a memory device according to an embodiment of the disclosure. A memory device 100 may be applied to an electronic device, wherein the electronic device may be a mobile phone, a tablet computer, a notebook computer, a desktop computer, etc. Please refer to FIG. 1. The memory device 100 includes a memory controller 110, an address transforming circuit 120, and a memory array 130. In the embodiment, the memory device 100 is, for example, an embedded flash memory. In some embodiments, the memory device 100 is, for example, an embedded dynamic random access memory (DRAM), an embedded non-volatile random access memory (NVRAM), etc.

In the embodiment, the memory array 130 is coupled to the memory controller 110 and the address transforming circuit 120. In the embodiment, the memory array 130 may be divided into multiple banks to store data. The data are, for example, programming codes formed by using hardware description languages (for example, Verilog HDL or VHDL) or other suitable programming languages. The data may be used to implement functions in various booting programs or other applications (hereinafter referred to as an application).

In the embodiment, the memory controller 110 is coupled to the address transforming circuit 120 and the memory array 130. The memory controller 110 is further coupled to a processor (for example, a central processing unit, not shown) of the electronic device. In the embodiment, the memory controller 110 is controlled by the processor to access the memory array 130 through a control signal such as an address signal, a data signal, and a read/write signal, so that the processor implements the function of the application according to the programming codes in the memory array 130. In the embodiment, the memory controller 110 is, for example, a flash memory controller (FMC).

In the embodiment, the address transforming circuit 120 is coupled between the memory controller 110 and the memory array 130. In the embodiment, the address transforming circuit 120 may store multiple physical address data and multiple mask data. The physical address data respectively correspond to multiple candidate programming addresses in the address signal, so as to respectively point to multiple corresponding banks in the memory array 130.

Figure 2:
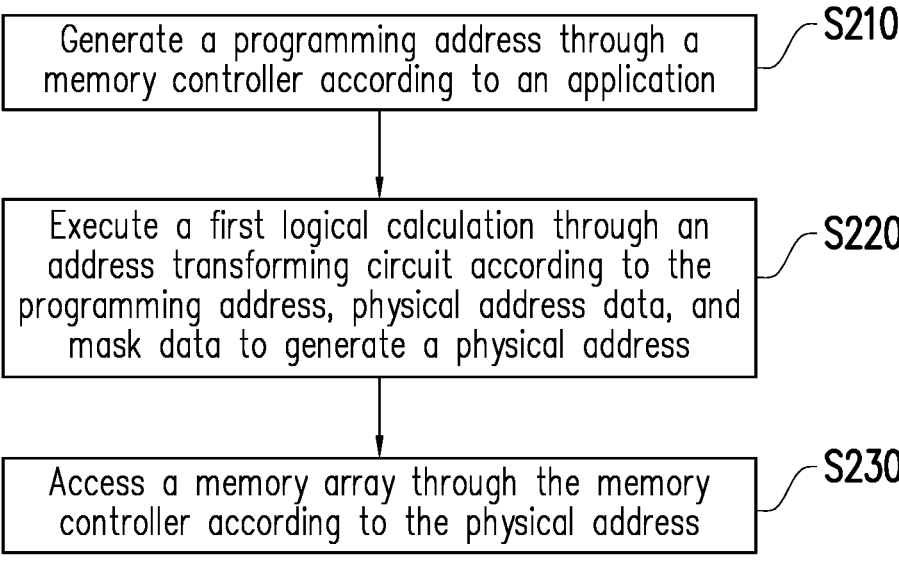
FIG. 2 is a flowchart of an operating method of a memory device according to an embodiment of the disclosure.

FIG. 2 is a flowchart of an operating method of a memory device according to an embodiment of the disclosure. Please refer to FIG. 1 and FIG. 2. The memory device 100 may execute, for example, Steps S210 to S230 below to access the memory array 130. In the embodiment, Steps S210 to S230 may be applied to the following exemplary situations.

In the embodiment, when the electronic device is turned on (that is, powered on), the processor executes a booting program to transform a programming address corresponding to the booting program into a physical address through the memory device 100. In some embodiments, when the electronic device implements a specific function, the processor executes another corresponding application to transform a programming address corresponding to the other application into a physical address through the memory device 100. The memory device 100 executes an access operation according to the transformed physical address, so that the electronic device executes the booting program or the other application (hereinafter referred to as the application).

Specifically, in Step S210, a programming address S1 among multiple candidate programming addresses is generated by the memory controller 110 according to the application executed by the processor.

In Step S220, the address transforming circuit 120 executes a first logical calculation according to the programming address S1, the physical address data, and the mask data to generate a physical address S2. It should be noted that the first logical calculation is a calculation using at least one logical gate or logical operator, rather than a mapping operation such as a lookup table.

In Step S230, the memory controller 110 executes the access operation on the memory array 130 according to the physical address S2, so that the electronic device executes the application.

It is worth mentioning here that the memory device 100 can execute the logical calculation on the programming address S1 through the address transforming circuit 120 to generate the physical address S2 pointing to the memory array 130, instead of simply generating the physical address S2 by mapping. Therefore, without changing the memory controller 110, the address transforming circuit 120 transforms the programming address S1 into an address corresponding to various ranges of the memory array 130 (that is, the physical address S2) to be used for change of multiple activation addresses in a TrustZone architecture and used for exchange of a flash base address in an application firmware update architecture, so as to correctly access the memory device 100.

Figure 3:
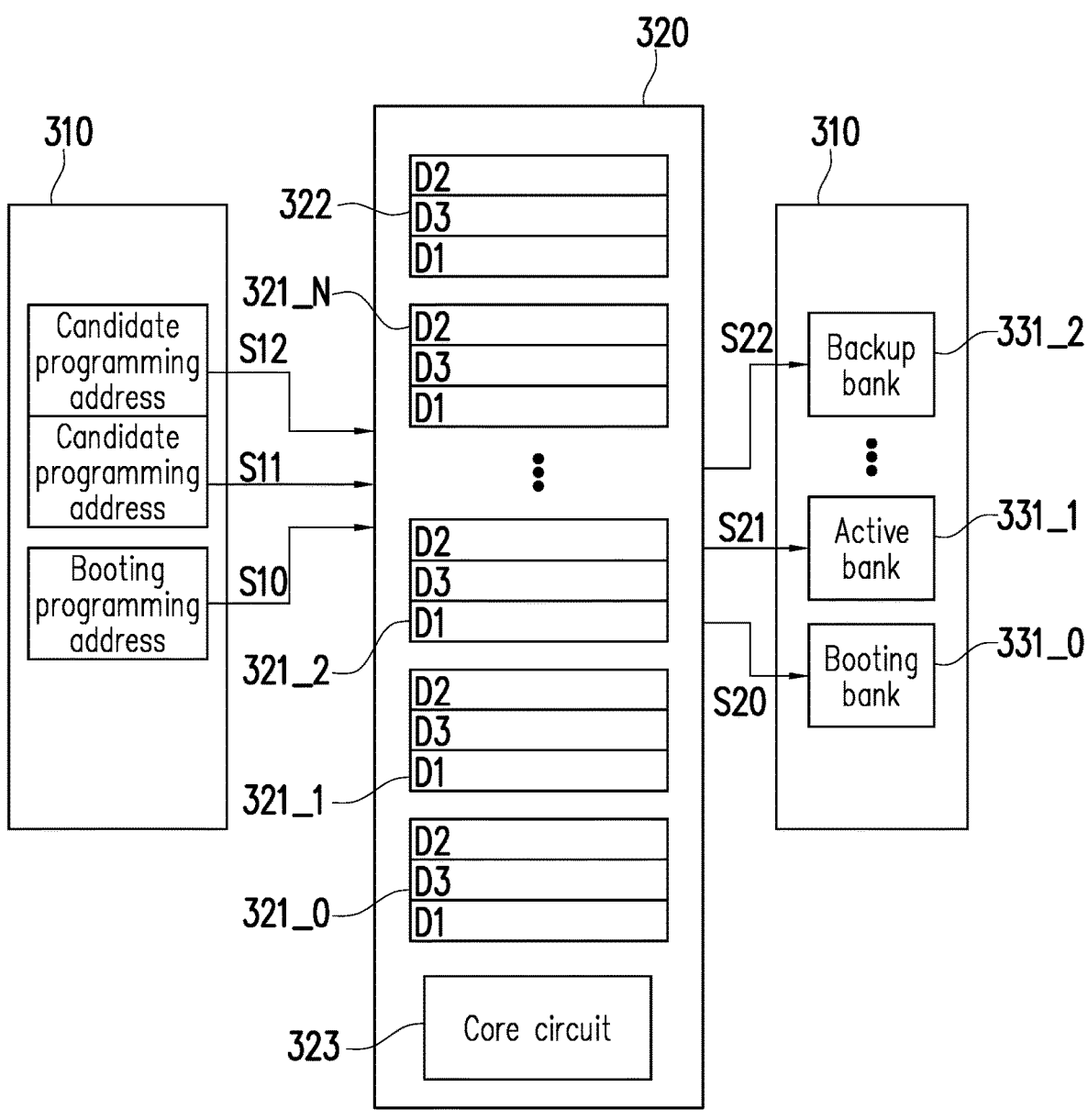
FIG. 3 is a block diagram of a memory device according to an embodiment of the disclosure.

FIG. 3 is a block diagram of a memory device according to an embodiment of the disclosure. Please refer to FIG. 3. A memory device 300 includes a memory controller 310, an address transforming circuit 320, and a memory array 330. The memory device 300 shown in FIG. 3 may be analogized by referring to the related description of the memory device 100 shown in FIG. 1.

In the embodiment, the memory array 330 may be divided into multiple banks 331_0 to 331_2 to store data. The data in the banks 331_0 to 331_2 are, for example, programming codes to implement the function of the corresponding application. The banks 331_0 to 331_2 have corresponding physical addresses S20 to S22. Specifically, in the embodiment, the programming codes corresponding to a booting program may be stored in the booting bank 331_0 and has the booting physical address S20. The programming codes corresponding to a first application other than the booting program may be stored in the active bank 331_1 and has the active bank physical address S21. The programming codes corresponding to a second application other than the booting program may be stored in the backup bank 331_2 and have the backup bank physical address S22. The number and configuration of the banks 331_0 to 331_2 and the corresponding physical addresses S20 to S22 of the embodiment are only examples and are not limited thereto.

In the embodiment, each of the physical addresses S20 to S22 includes multiple bit values. Taking a 32-bit address as an example, an address range of the physical addresses S20 to S22 is, for example, 0x2000 to 0x2FFFF.

In the embodiment, the memory controller 310 generates one of the candidate programming addresses S10 to S12 as the programming address according to the application executed by the processor. Specifically, in the embodiment, the memory controller 310 generates the booting programming address S10 as the programming address according to the booting program. The memory controller 310 generates the candidate programming address S11 as the programming address according to the first application. The memory controller 310 generates the candidate programming address S12 as the programming address according to the second application. The number and configuration of the candidate programming addresses S10 to S12 of the embodiment are only examples and are not limited thereto.

In the embodiment, each of the candidate programming addresses S10 to S12 includes multiple bit values. Taking a 32-bit address as an example, an address range of the candidate programming addresses S10 to S12 is, for example, 0x20010000 to 0x2001FFFF.

In the embodiment, the address transforming circuit 320 includes multi-stage sub-address transforming circuits 321_0 to 321_N, where N is a positive integer. The number of the multi-stage sub-address transforming circuits 321_0 to 321_N of the embodiment is only an example and is not limited thereto. Specifically, in the embodiment, an $i^{th}$-stage sub-address transforming circuit 321_i among the multi-stage sub-address transforming circuits 321_0 to 321_N is coupled to the memory controller 310 and the memory array 330, where i is a non-negative integer.

Taking i as 1 as an example, the $1^{st}$-stage sub-address transforming circuit 321_1 is coupled to the memory controller 310 and the memory array 330. The $1^{st}$-stage sub-address transforming circuit 321_1 may store physical address data D2, mask data D3, and programming address data D1, wherein the programming address data D1 and the physical address data D2 respectively correspond to one of the candidate programming addresses S10 to S12, such as the candidate programming address S11. The $0^{th}$-stage sub-address transforming circuit 321_0, the $2^{nd}$-stage sub-address transforming circuit 321_2, and the $N^{th}$-stage sub-address transforming circuit 321_N may be analogized by referring to the related description of the $1^{st}$-stage sub-address transforming circuit 321_1, so there will be no repetition. It should be noted that the data D1 to D3 stored in the $0^{th}$-stage sub-address transforming circuit 321_0 are associated with the booting program and the booting bank 331_0.

In the embodiment, the $i^{th}$-stage sub-address transforming circuit 321_i includes multiple register circuits (not shown). The register circuits respectively store the corresponding programming address data D1, the corresponding mask data D3, and the corresponding physical address data D2. In some embodiments, the $i^{th}$-stage sub-address transforming circuit 321_i is implemented as multiple register circuits.

Taking i as 1 as an example, each temporary register circuit in the $1^{st}$-stage sub-address transforming circuit 321_1 is, for example, a 32-bit temporary register. The 32-bit registers respectively store the programming address data D1, the physical address data D2, and the mask data D3. The programming address data D1, the physical address data D2, and the mask data D3 respectively include 32-bit values and correspond to the candidate programming address S11 as the programming address.

For example, the data D1 to D3 in the $1^{st}$-stage sub-address transforming circuit 321_1 and the corresponding bit values of the candidate programming address S11 are shown in Table (1). The data D1 to D3 and the bit values of the candidate programming address S11 of the embodiment are only examples and are not limited thereto. Please refer to FIG. 3 and Table (1) together.

TABLE 1

| Data | Bit value |
| --- | --- |
| Programming address data D1 ($1^{st}$-stage sub-address transforming circuit 321_1) | 0x20010000 |
| Mask data D3 ($1^{st}$-stage sub-address transforming circuit 321_1) | 0xFFFF0000 |
| Physical address data D2 ($1^{st}$-stage sub-address transforming circuit 321_1) | 0x00020000 |
| Candidate programming address S11 | 0x200103F0 |

It should be noted that the mask data D3 is used to perform logical calculations with other data to mask a part of the bit values and obtain other parts of the bit values that are not masked. For example, in the embodiment, the mask data D3 includes multiple first bit values (that is, "FFFF") and multiple second bit values (that is, "0000"). When a logical AND calculation is performed on the mask data D3 and the candidate programming address S11, the first 16-bit value (that is, "2001") corresponding to the candidate programming address S11 can be fetched using the first bit values (that is, "FFFF"), and the last 16-bit value (that is, "03F0") corresponding to the candidate programming address S11 can be masked using the second bit values (that is, "0000"), so as to obtain a logical calculation result of 0x20010000.

For another example, in the embodiment, when a logical AND calculation is performed on the inversion of the mask data D3 (that is, "0x0000FFFF") and the candidate programming address S11, the corresponding first 16-bit value (that is, "2001") in the candidate programming address S11 can be masked using the inverted first bit values (that is, "0000"), and the corresponding last 16-bit value (that is, "03F0") in the candidate programming address S11 can be fetched using the inverted second bit values (that is, "FFFF"), so as to obtain a logical calculation result of 0x000003F0.

In the embodiment, the address transforming circuit 320 further includes a default sub-address transforming circuit 322. The default sub-address transforming circuit 322 is coupled to the memory controller 310 and the memory array 330. In the embodiment, the default sub-address transforming circuit 322 includes multiple register circuits (not shown). The register circuits respectively store the corresponding programming address data D1, the corresponding mask data D3, and the corresponding physical address data D2. In some embodiments, the circuit configuration of the default sub-address transforming circuit 322 is the same as the circuit configuration of the $i^{th}$-stage sub-address transforming circuit 321_i and may be analogized by referring to the related description of the $1^{st}$-stage sub-address transforming circuit 321_1, so there will be no repetition.

In the embodiment, the address transforming circuit 320 further includes a core circuit 323. The core circuit 323 is coupled to the memory controller 310, the register circuits in the multi-stage sub-address transforming circuits 321_0 to 321_N, the register circuits in the default sub-address transforming circuit 322, and the memory array 330. In the embodiment, the core circuit 323 may execute multiple logical calculations with the it $i^{th}$-stage sub-address transforming circuit 321_i and/or the default sub-address transforming circuit 322 according to one of the candidate programming addresses S10 to S12 to generate the corresponding physical address S20 to S22.

In the embodiment, the core circuit 323 includes multiple logic gates (not shown). The logic gates may respectively execute AND logical calculations and OR logical calculations. In some embodiments, the core circuit 323 is implemented with multiple logic gates. In some embodiments, the core circuit 323 is, for example, a signal transformer, a field programmable gate array (FPGA), a central processing unit (CPU), other programmable general purpose or specific purpose microprocessors, digital signal processors (DSPs), programmable controllers, application specific integrated circuits (ASICs), programmable logic devices (PLDs), other similar devices, or a combination of the devices, which may load and execute related firmware or software to implement the logical calculation function of the disclosure.

FIG. 4 is a flowchart of an operating method of a memory device according to an embodiment of the disclosure. Please refer to FIG. 3 and FIG. 4. The memory device 300 may execute, for example, Steps S410 to S450 below to access the memory array 330.

In Step S410, the memory device 300 starts to work.

In the embodiment, when the electronic device is turned on, the processor executes the booting program, and the memory controller 310 generates one of the candidate programming addresses S10 to S12 (for example, the booting programming address S10) as the programming address according to the booting program. In the embodiment, when the electronic device implements the specific function, the processor executes another corresponding application, and the memory controller 310 generates one of the candidate programming addresses S10 to S12 (for example, the candidate programming address S11) as the programming address according to the application.

In Step S420, the core circuit 323 receives the programming address (for example, the booting programming address S10 or the candidate programming address S11). The core circuit 323 executes a second logical calculation with the $i^{th}$-stage sub-address transforming circuit according to the received programming address to judge whether the core circuit 323 executes the first logical calculation with the it-stage sub-address transforming circuit, wherein the default value of i is 0. In the embodiment, steps of the second logical calculation may include Steps S421 to S424 below.

Taking i as 1 as an example, when the electronic device is turned on and the processor executes the application, the core circuit 323 receives the candidate programming address S11 (referred to as the programming address S11 in the following embodiment) as the programming address, and accesses the data D1 to D3 in the $1^{st}$-stage sub-address transforming circuit 321_1. In the embodiment, the programming address S11 and the data D1 to D3 are respectively, for example, the 32-bit value data shown in Table (1) above.

In Step S421, the core circuit 323 executes an AND logical calculation on the programming address S11 and the mask data D3 in the $1^{st}$-stage sub-address transforming circuit 321_1 to generate a second result. In the embodiment, the second result includes multiple first bit values and multiple second bit values. The second result is, for example, 32-bit value data and includes the first 16-bit value data and the last 16-bit value data corresponding to the mask data D3.

For example, please refer to Table (1) together. The core circuit 323 fetches the corresponding first 16-bit value (that is, "2001") in the programming address S11 through the first bit values (that is, "FFFF") of the mask data D3. In addition, the core circuit 323 masks the corresponding last 16-bit value (that is, "03F0") in the programming address S11 through the second bit values (that is, "0000") of the mask data D3. In the embodiment, the second result after the AND logical calculation is, for example, 0x20010000.

In Step S422, the core circuit 323 judges whether the first bit values (for example, the first 16-bit value) of the second result are the same as the first bit values (for example, the first 16-bit value) corresponding to the programming address data D1 to generate a judgment result. If yes, the memory device 300 executes Step S430. If not, the memory device 300 executes Step S423.

In Step S423, when the judgment result of Step S422 is not the same, it means that the programming address S11 is not transformed into the physical addresses S20 to S22 using the $1^{st}$-stage sub-address transforming circuit 321_1. At this time, the core circuit 323 sets i (for example, 1) to i+1 (for example, 2) to shift to the next-stage sub-address transforming circuit 321_2.

In Step S424, the core circuit 323 judges whether i is greater than N, where N represents the last stage circuit among the multi-stage sub-address transforming circuits 321_0 to 321_N. If yes, the memory device 300 executes Step S440. If not, the memory device 300 executes Step S420 again.

In the re-executed Step S420, when the judgment result of Step S422 is not the same, and the corresponding $1^{st}$-stage sub-address transforming circuit 321_1 in Step S421 is one of the multi-stage sub-address transforming circuits 321_0 to 321_N (where i is not greater than N), the core circuit 323 executes the second logical calculation with the $i+1^{th}$-stage sub-address transforming circuit (that is, the $2^{nd}$-stage sub-address transforming circuit 321_2) according to the programming address S11 to judge whether the core circuit 323 executes the first logical calculation with the current-stage sub-address transforming circuit 321_2, and the memory device 300 continues to execute Steps S421 to S424.

In Step S430, when the determination result of Step S422 is the same, it means that the programming address S11 is transformed into the physical addresses S20 to S22 using the $1^{st}$-stage sub-address transforming circuit 321_1. At this time, the core circuit 323 executes the first logical calculation with the $i^{th}$-stage sub-address transforming circuit (that is, the $1^{st}$-stage sub-address transforming circuit 321_1) to generate the corresponding physical address S20 to S22 (for example, the physical address S21). In the embodiment, steps of the first logical calculation may include Steps S431 and S432 below, and the first logical calculation is as shown in Equation (2) below:

$$S21=D2|(S11 \ \& \ {\sim}D3).$$

The programming address S11 and the physical address S21 in Equation (2) are only for illustration. The programming address S11 may be another programming address S10 or S12, and the physical address S21 may be another corresponding physical address S20 or S22.

In Step S431, the core circuit 323 executes an AND logical calculation on the programming address S11 and the inversion of the mask data D3 in the $1^{st}$-stage sub-address transforming circuit 321_1 to generate a first result.

For example, please refer to Table (1) together. The core circuit 323 fetches the corresponding last 16-bit value (that is, "03F0") in the programming address S11 through the second bit values (that is, "FFFF") of the inverted mask data D3. In addition, the core circuit 323 masks the corresponding first 16-bit value (that is, "2001") in the programming address S11 through the first bit values (that is, "0000") of the inverted mask data D3. In the embodiment, the first result after the AND logical calculation is, for example, 0x000003F0.

In Step S432, the core circuit 323 executes an OR logical calculation on the first result and the physical address data D2 in the $1^{st}$-stage sub-address transforming circuit 321_1 to generate one of the physical addresses S20 to S22 (for example, the physical address S21).

For example, please refer to Table (1) together. The core circuit 323 executes the OR logical calculation on the first result (that is, 0x000003F0) and the physical address data D2 (that is, 0x00020000) to generate the physical address S21 (that is, 0x000203F0).

It should be noted that in the embodiment, the candidate programming addresses S10 to S12 are multiple consecutive addresses. The physical addresses S20 to S22 generated from the candidate programming addresses S10 to S12 after executing the first logical calculation are multiple inconsecutive addresses to respectively point to the corresponding banks $331\_0$ to $331\_2$.

In the embodiment, the memory controller 310 executes the access operation on the active bank $331\_1$ according to the physical address S21, and ends work in Step S450. In some embodiments, in response to the requirements of different applications, the core circuit 323 may execute the first logical calculation with the $1^{st}$-stage sub-address transforming circuit $321\_1$ according to the programming address S11 to generate another physical address (for example, the physical address S22) other than the physical address S21, so that the memory controller 310 accesses the backup bank $331\_2$ according to the physical address S22.

It should be noted that when the electronic device executes the application to implement the specific function, such as when updating firmware, an operator may preset the $1^{st}$-stage sub-address transforming circuit $321\_1$ to correspond to the active bank $331\_1$, and preset the $2^{nd}$-stage sub-address transforming circuit $321\_1$ to correspond to the backup bank $331\_2$. For example, in the embodiment, the programming address data D1 in the $1^{st}$-stage sub-address transforming circuit $321\_1$ corresponds to the flash base address (for example, the programming address S11) required when compiling the firmware, and the physical address data D2 corresponds to the physical address S21 required when compiling the firmware. The programming address data D1 in the $2^{nd}$-stage sub-address transforming circuit $321\_2$ corresponds to the flash base address (for example, the programming address S12) required when executing the firmware, and the physical address data D2 corresponds to the physical address S22 when executing the firmware.

Continuing the above description, firstly, the firmware to be updated is downloaded and stored in the backup bank $331\_2$. Furthermore, when the firmware is updated, the operator may exchange the physical address data D2 in the $1^{st}$-stage sub-address transforming circuit $321\_1$ with the physical address data D2 in the $2^{nd}$-stage sub-address transforming circuit $321\_2$, so that the required physical address is transformed from the physical address S21 to the physical address S22 when executing the firmware. In this way, when the electronic device executes the updated firmware, the backup bank $331\_2$ can be accessed. Therefore, by using the exchanged physical addresses S21 and S22, the memory device 300 can apply the exchange of the flash base address to support updating the firmware, and update the firmware in a simple setting manner without copying the updated firmware from the backup bank $331\_2$ to the active bank $331\_1$ to execute the updated firmware.

In the embodiment, when the electronic device executes other applications to implement other specific functions, the operator may set the physical address data D2 in the $N^{th}$-stage sub-address transforming circuit $321\_N$ to correspond to banks other than the active bank $331\_1$ and the backup bank $331\_2$. It should be noted that since the other banks are independent of the active bank $331\_1$ or the backup bank $331\_2$, firmware stored in the other banks are not affected by the firmware being updated in the active bank $331\_1$ or the backup bank $331\_2$ and can be used to store important data.

Returning to Step S424, when the judgment results of Steps S422 and S424 are all not the same, it means that the $i^{th}$-stage sub-address transforming circuit $321\_i$ in Step S420 is not any one of the multi-stage sub-address transforming circuits $321\_0$ to $321\_N$ (that is, i is greater than N). In other words, none of the multi-stage sub-address transforming circuits $321\_0$ to $321\_N$ from the $0^{th}$-stage transforming circuit $321\_0$ to the $N^{th}$-stage transforming circuit $321\_N$ correspond to the programming address S11, so the programming address S11 is not transformed into the physical address S20 to S22 using any one of the multi-stage sub-address transforming circuits $321\_0$ to $321\_N$.

In Step S440, when the judgment results in Step S422 corresponding to the multi-stage sub-address transforming circuits $321\_0$ to $321\_N$ of are all not the same, the core circuit 323 executes the first logical calculation with the default sub-address transforming circuit 322 according to the programming address S11. The first logical calculation may be analogized by referring to the related description of Steps S431 and S432 above, so there will be no repetition. On the other hand, returning to Step S420, taking i as 0 as an example, when the electronic device is turned on and the processor executes the booting program, the core circuit 323 receives the booting programming address S10 (referred to as the programming address S10 in the following embodiment), and accesses the data D1 to D3 in the $0^{th}$-stage sub-address transforming circuit $321\_0$ to execute the second logical calculation with the $0^{th}$-stage sub-address transforming circuit $321\_0$. The data D1 to D3 in the $0^{th}$-stage sub-address transforming circuit $321\_0$ may be analogized by referring to the related description of the data D1 to D3 in the $1^{st}$-stage sub-address transforming circuit $321\_1$, so there will be no repetition.

In the embodiment, the memory device 300 continues to execute Steps S421, S422, S423, S430, and S431 to S440. Specifically, in Step S421, the core circuit 323 executes an AND logical calculation on the programming address S10 and the mask data D3 in the $0^{th}$-stage sub-address transforming circuit $321\_0$ to generate the second result. In Step S422, the core circuit 323 judges that the first bit values (for example, the first 16-bit value) of the second result are the same as the first bit values (for example, the first 16-bit value) corresponding to the programming address data D1 to continue Step S430. In some embodiments, the memory device 300 does not execute the second logical calculation in Step S420, and ignores Steps S421, S422, and S423 to directly execute Step S430.

In Step S430, the core circuit 323 executes the first logical calculation with the $0^{th}$-stage sub-address transforming circuit $321\_0$ according to the programming address S10 to generate the corresponding physical address S20 to S22 (for example, the booting physical address S20). Specifically, the core circuit 323 executes the first logical calculation according to the programming address S10 and the physical address data D2 and the mask data D3 in the $0^{th}$-stage sub-address transforming circuit $321\_0$ to generate the booting physical address S20. The first logical calculation may be analogized by referring to the related description of Steps S431 and S432 above, so there will be no repetition. At this time, the memory controller 310 executes the access operation on the booting bank $331\_0$ in the memory array 330 according to the booting physical address S20, and ends work in Step S450.

It should be noted that when the electronic device is turned on and the processor executes the booting program, the operator may preset the programming address data D1 and the physical address data D2 in the $0^{th}$-stage sub-address transforming circuit $321\_0$ according to different turn-on requirements to support different booting programs being applied to change of multiple booting addresses. Therefore, using the changed booting physical address S21, the memory device 300 can be applied to a special architecture (for example, TrustZone), so that the booting physical address S21 corresponds to the booting bank 331_0 of a secure code or corresponds to the booting bank 331_0 of a non-secure code, which can facilitate the operator to perform development operations such as testing or debugging.

In summary, the memory device and the operating method thereof of the embodiments of the disclosure can execute the logical calculation on the programming address to generate the physical address in various ranges through the address transforming circuit, rather than simply generating the physical address by mapping. Therefore, the memory device can be used for change of multiple booting addresses and exchange of the flash base address to correctly access the memory device. In some embodiments, the physical addresses corresponding to different banks can be exchanged through the address transforming circuit to prevent the firmware being updated from being affected, and to speed up update of the programming address of the firmware.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory device, comprising:
a memory controller, used to generate a programming address among a plurality of candidate programming addresses according to an application;
an address transforming circuit, coupled to the memory controller and used to store a plurality of physical address data and a plurality of mask data, wherein the physical address data respectively correspond to the candidate programming addresses, and the address transforming circuit is used to execute a first logical calculation according to the programming address, the physical address data, and the mask data to generate a physical address, and to execute a second logical calculation with an $i^{th}$-stage sub-address transforming circuit according to the programming address to judge whether to execute the first logical calculation with the $i^{th}$-stage sub-address transforming circuit, and i is a non-negative integer; and
a memory array, coupled to the memory controller and the address transforming circuit, wherein the memory controller is used to execute an access operation on the memory array according to the physical address,
wherein the address transforming circuit comprises:
a multi-stage sub-address transforming circuit, wherein the $i^{th}$-stage sub-address transforming circuit in the multi-stage sub-address transforming circuit is coupled to the memory controller and the memory array,
wherein the $i^{th}$-stage sub-address transforming circuit is used to store corresponding programming address data, the corresponding physical address data, and the corresponding mask data, the programming address data respectively correspond to the candidate programming addresses.

2. The memory device according to claim 1, wherein the $i^{th}$-stage sub-address transforming circuit comprises:
a plurality of register circuits, respectively used to store the corresponding programming address data, the corresponding physical address data, and the corresponding mask data.

3. The memory device according to claim 2, wherein the address transforming circuit further comprises:

a core circuit, coupled to the memory controller, the register circuits, and the memory array, and used to execute the first logical calculation with the $i^{th}$-stage sub-address transforming circuit according to the programming address.

4. The memory device according to claim 3, wherein the core circuit executing the first logical calculation with the $i^{th}$-stage sub-address transforming circuit according to the programming address comprises:
executing an AND logical calculation on the programming address and an inversion of the corresponding mask data to generate a first result; and
executing an OR logical calculation on the first result and the corresponding physical address data to generate the physical address.

5. The memory device according to claim 3, wherein the core circuit is further used to execute the second logical calculation with the $i^{th}$-stage sub-address transforming circuit according to the programming address to judge whether the core circuit executes the first logical calculation with the $i^{th}$-stage sub-address transforming circuit.

6. The memory device according to claim 5, wherein the core circuit executing the second logical calculation with the $i^{th}$-stage sub-address transforming circuit according to the programming address comprises:
executing an AND logical calculation on the programming address and the corresponding mask data to generate a second result, wherein the second result comprises a plurality of first bit values and a plurality of second bit values;
judging whether the first bit values of the second result are the same as a plurality of first bit values corresponding to the corresponding programming address data to generate a judgment result;
when the judgment result is the same, executing the first logical calculation with the $i^{th}$-stage sub-address transforming circuit; and
when the judgment result is not the same, executing the second logical calculation with an $i+1^{th}$-stage sub-address transforming circuit according to the programming address.

7. The memory device according to claim 6, wherein the address transforming circuit further comprises:
a default sub-address transforming circuit, coupled to the memory controller and the memory array, and used to store the corresponding programming address data, the corresponding mask data, and the corresponding physical address data,
wherein when the judgment results corresponding to the multi-stage sub-address transforming circuit are all not the same, the core circuit executes the first logical calculation with the default sub-address transforming circuit according to the programming address.

8. The memory device according to claim 7, wherein when the memory device is turned on, the memory controller generates a booting programming address among the candidate programming addresses, the core circuit executes the first logical calculation according to the booting programming address, the corresponding physical address data, and the corresponding mask data to generate a booting physical address, and the memory controller executes the access operation on the memory array according to the booting physical address.

9. The memory device according to claim 1, wherein the candidate programming addresses are a plurality of consecutive addresses, and a plurality of physical addresses generated from the candidate programming addresses after executing the first logical calculation are a plurality of inconsecutive addresses.

10. An operating method of a memory device, comprising:

generating a programming address among a plurality of candidate programming addresses through a memory controller according to an application;

executing a first logical calculation through an address transforming circuit according to the programming address, a plurality of physical address data, and a plurality of mask data to generate a physical address, wherein the address transforming circuit is used to store the physical address data and the mask data, and the physical address data respectively correspond to the candidate programming addresses;

executing a second logical calculation with an $i^{th}$-stage sub-address transforming circuit through an address transforming circuit according to the programming address to judge whether to execute the first logical calculation with the $i^{th}$-stage sub-address transforming circuit, and i is a non-negative integer; and executing an access operation on a memory array through the memory controller according to the physical address, wherein the address transforming circuit comprises:

a multi-stage sub-address transforming circuit, wherein the $i^{th}$-stage sub-address transforming circuit in the multi-stage sub-address transforming circuit is coupled to the memory controller and the memory array, wherein the $i^{th}$-stage sub-address transforming circuit is used to store the corresponding physical address data, the corresponding mask data, and corresponding programming address data, the programming address data respectively correspond to the candidate programming addresses.

11. The operating method according to claim 10, wherein the $i^{th}$-stage sub-address transforming circuit comprises:

a plurality of register circuits, respectively used to store the corresponding physical address data, the corresponding mask data, and the corresponding programming address data.

12. The operating method according to claim 11, further comprising:

executing the first logical calculation with the $i^{th}$-stage sub-address transforming circuit through a core circuit in the address transforming circuit according to the programming address, wherein the core circuit is coupled to the memory controller, the register circuits, and the memory array.

13. The operating method according to claim 12, wherein the step of executing the first logical calculation with the $i^{th}$-stage sub-address transforming circuit through the core circuit according to the programming address comprises:

executing an AND logical calculation on the programming address and an inversion of the corresponding mask data to generate a first result; and executing an OR logical calculation on the first result and the corresponding physical address data to generate the physical address.

14. The operating method according to claim 12, wherein the second logical calculation is executed with the $i^{th}$-stage sub-address transforming circuit through the core circuit according to the programming address to judge whether the core circuit executes the first logical calculation with the $i^{th}$-stage sub-address transforming circuit.

15. The operating method according to claim 14, wherein the step of executing the second logical calculation with the $i^{th}$-stage sub-address transforming circuit through the core circuit according to the programming address comprises:

executing an AND logical calculation on the programming address and the corresponding mask data to generate a second result, wherein the second result comprises a plurality of first bit values and a plurality of second bit values;

judging whether the first bit values of the second result are the same as a plurality of first bit values corresponding to the corresponding programming address data to generate a judgment result;

when the judgment result is the same, executing the first logical calculation with the $i^{th}$-stage sub-address transforming circuit; and when the judgment result is not the same, executing the second logical calculation with an $i+1^{th}$-stage sub-address transforming circuit according to the programming address.

16. The operating method according to claim 15, wherein the address transforming circuit further comprises:

a default sub-address transforming circuit, coupled to the memory controller and the memory array, and used to store the corresponding physical address data, the corresponding mask data, and the corresponding programming address data, wherein the operating method further comprises:

when the judgment results corresponding to the multi-stage sub-address transforming circuit are all not the same, executing the first logical calculation with the default sub-address transforming circuit through the core circuit according to the programming address.

17. The operating method according to claim 16, further comprising:

when the memory device is turned on, generating a booting programming address among the candidate programming addresses through the memory controller;

executing the first logical calculation according to the booting programming address, the corresponding physical address data, and the corresponding mask data through the core circuit to generate a booting physical address; and executing the access operation on the memory array through the memory controller according to the booting physical address.

18. The operating method according to claim 10, wherein the candidate programming addresses are a plurality of consecutive addresses, and a plurality of physical addresses generated from the candidate programming addresses after executing the first logical calculation are a plurality of inconsecutive addresses.

* * * * *